D. MACK.
COMBINED SEEDERS AND CULTIVATORS.
No. 193,883. Patented Aug. 7, 1877.
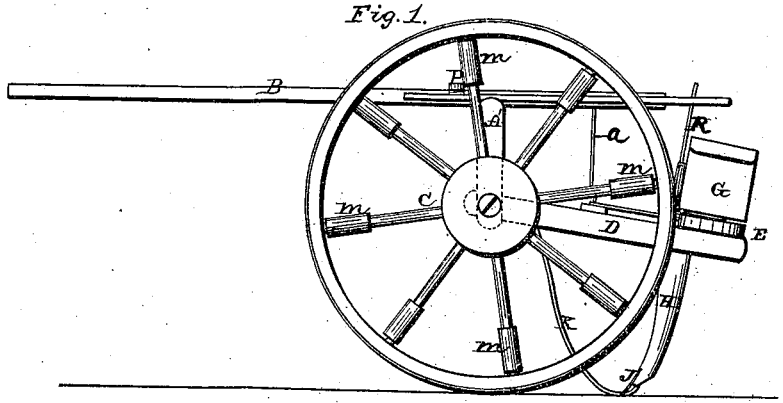
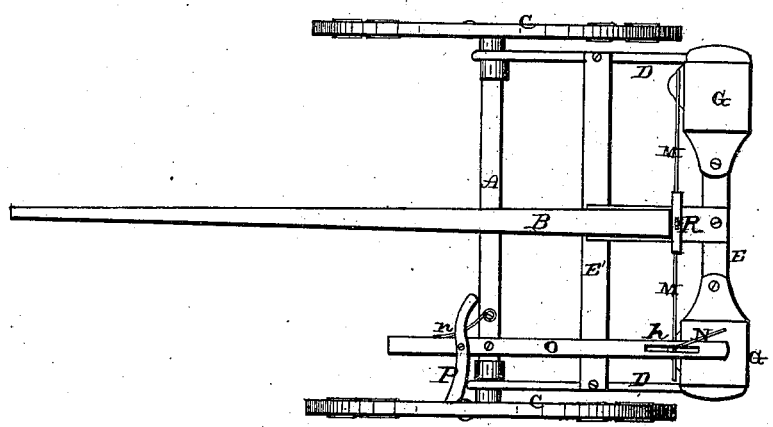
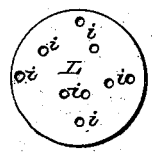
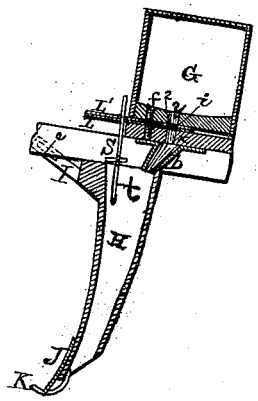
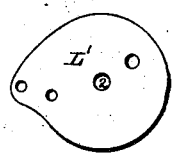
WITNESSES:
INVENTOR:

UNITED STATES PATENT OFFICE.

DAVID MACK, OF BARNESVILLE, ASSIGNOR OF ONE-HALF HIS RIGHT TO GEO. STEWART AND HENRY EBEY, OF ROCKVILLE, KANSAS.

IMPROVEMENT IN COMBINED SEEDER AND CULTIVATOR.

Specification forming part of Letters Patent No. 193,883, dated August 7, 1877; application filed April 11, 1877.

*To all whom it may concern:*

Be it known that I, DAVID MACK, of Barnesville, in the State of Kansas, have invented certain new and useful Improvements in Combined Seeder and Cultivator; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a corn-planter, as will be hereinafter more fully set forth.

Figure 1 is a side elevation of my invention. Fig. 2 is a plan view of the same. Fig. 3 is a section of the seed box and tube. Figs. 4 and 5 are plan views of the two seed-plates.

A represents the axle-tree, on top of which, in the center, is secured the tongue B. At each end of the axle-tree A is a downwardly-extending arm, A', from the lower end of which projects a spindle to receive the wheel C. On these spindles, inside of the wheels are also pivoted two beams, D D, which are connected by means of two cross-bars, E E', and the front cross-bar E' is, by a hook, a, connected with the rear end of the tongue, for holding up the planting mechanism in going to and from the field.

On the rear cross-bar E are secured the two corn-boxes or hoppers G G, and under each box in the cross-bar is a dropping-hole, x, below which is a small spout, b, conducting the corn into the hollow tube or conductor H. This tube or conductor is pivoted to the inner side of the beam D, and held in place by a brace, I, which is pivoted to an ear on the front of the tube, and its upper end slotted, and fastened to the beam by a screw, e, passing through the slot, whereby the tubes can be adjusted at any angle desired.

To the lower end of the tube or conductor H is secured a small narrow shovel, J, and a runner, K, extends from the point of the shovel upward and forward, and is fastened to the beam by a screw through a slot in the runner, whereby said runner is also adjusted to correspond with the adjustment of the conductor.

In the bottom of the hopper G is a dropping-hole, y, through which the corn is deposited on the dropping plate, and by it conveyed to the dropping-hole x in the cross-bar E.

There are two plates, L and L', between the bottom of the hopper and the cross-bar, both pivoted by one screw or pin, f. The bottom plate L is the dripping-plate, and is provided with a series of dropping-holes, i i, of different sizes, to be used according to the number of grains to be dropped in each hill. All the holes of the plate L except the one used are covered by the plate L', in which is a single dropping-hole, z, coinciding with either one of the holes i in the plate L, according as said latter plate may be turned on its pivot.

When the plates L L' for each hopper are adjusted as desired, they are connected to a cross-bar, M, and this cross-bar is connected to a lever, N, pivoted to the front side of one of the corn-boxes or droppers G. The upper end of this lever is inserted in a longitudinal slot, h, in the rear end of another lever, O, pivoted on the axle-tree A. On the front arm of this latter lever is pivoted a finger, P, the outer end of which is beveled, and extends far enough to be operated upon by knockers m, formed on or attached to one or more of the spokes of the wheel C on that side. When the machine moves forward these knockers, striking the finger P, cause the lever O to turn on its pivot, so as to, by means of the lever N, give the cross-bar M a lateral motion, and as soon as the knocker m passes beyond the finger, a spring, n, operating against the lever O, brings the parts back to their former position.

As the finger P is pivoted on the lever O, a pin is inserted in said lever, to prevent the finger from turning on its pivot when the planter moves forward, but will turn when the wheel is turning backward, and thus in the latter case prevent the dropping mechanism from acting.

The cross-bar M, connecting the two dropping mechanisms, is provided with a hand-lever, R, for operation by hand in check-rowing when desired.

In each tube or conductor H is a cut-off, t, connected to a pivoted rod, s, which is operated by the movement of the plates L L', as shown.

It will be noticed that the frame composed of the parts A A', B, and D D is simply an ordinary cultivator-frame, to which the hoppers and operating mechanisms are attached; hence an ordinary cultivator can be easily converted into a corn-planter by removing the cultivator-plows and bolting the conductors in their place. The cross-bars E E' are also then secured to the same beams. The plates L L' being below the regular bottom of the hopper, no dirt, small seeds, or chaff can obstruct the dropping, as is often the case in planters where the plates are worked inside of the boxes.

Having thus fully described my invention, what I claim as new, and desire to secure by Letters Patent, is—

1. In a corn-planter, the combination of the adjustable hollow tube or conductor H, the slotted brace I, shovel J, and runner K, slotted at its front end, all substantially as and for the purposes herein set forth.

2. The combination, with the plates L L' under each hopper G, of the cross-bar M, pivoted lever N, slotted pivoted lever O, with pin, the finger P, and the knockers m on the spokes of the wheel C, all substantially as and for the purposes herein set forth.

In testimony that I claim the foregoing I have hereunto set my hand this 22d day of March, 1877.

DAVID MACK.

Witnesses:
JOHN WM. McGHEE,
TIMOTHY HACKETT.